United States Patent
Ho

(10) Patent No.: US 9,331,950 B2
(45) Date of Patent: May 3, 2016

(54) APPARATUS AND METHOD FOR VOIP TRAFFIC FLOW IDENTIFICATION

(71) Applicant: HON HAI PRECISION INDUSTRY CO., LTD., New Taipei (TW)

(72) Inventor: Chen-Chang Ho, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 207 days.

(21) Appl. No.: 14/033,519

(22) Filed: Sep. 23, 2013

(65) Prior Publication Data
US 2014/0119179 A1    May 1, 2014

(30) Foreign Application Priority Data
Oct. 26, 2012    (TW) .................................. 101139595

(51) Int. Cl.
*H04L 12/851* (2013.01)
*H04L 12/805* (2013.01)
*H04L 12/853* (2013.01)

(52) U.S. Cl.
CPC ........ *H04L 47/2483* (2013.01); *H04L 47/2416* (2013.01); *H04L 47/36* (2013.01)

(58) Field of Classification Search
None
See application file for complete search history.

(56) References Cited

U.S. PATENT DOCUMENTS

| | | | |
|---|---|---|---|
| 2002/0133586 A1* | 9/2002 | Shanklin et al. | 709/224 |
| 2004/0196826 A1* | 10/2004 | Bao et al. | 370/352 |
| 2008/0037502 A1* | 2/2008 | Yokoyama | 370/342 |
| 2008/0130539 A1* | 6/2008 | Lauer et al. | 370/310 |
| 2012/0008499 A1 | 1/2012 | Stanwood et al. | |
| 2012/0281536 A1* | 11/2012 | Gell et al. | 370/235 |
| 2014/0067997 A1* | 3/2014 | Saabas et al. | 709/217 |

FOREIGN PATENT DOCUMENTS

| | | |
|---|---|---|
| JP | 2012100126 A | 5/2012 |
| JP | 2012134694 A | 7/2012 |
| TW | 2111140450 A1 | 11/2011 |
| TW | 201145904 A1 | 12/2011 |
| WO | 02057935 A1 | 7/2002 |

\* cited by examiner

*Primary Examiner* — Kwang B Yao
*Assistant Examiner* — Adam Duda
(74) *Attorney, Agent, or Firm* — Novak Druce Connolly Bove + Quigg LLP

(57) ABSTRACT

A data exchange device that identifies VoIP traffic flow. When a type of data flow is received by the data exchange device, the data exchange device determines whether the type of data flow is bidirectional traffic flow. If the type of data flow is bidirectional traffic flow, the data exchange calculates a first data size of downstream data of the type of data flow and a second data size of upstream data of the type of data flow. Then, the data exchange device identifies whether the type of data flow is the VoIP traffic flow according to the first data size and the second data size. If the type of data flow is the VoIP traffic flow, the type of data flow is processed according to a high priority.

14 Claims, 3 Drawing Sheets

APPARATUS AND METHOD FOR VOIP TRAFFIC FLOW IDENTIFICATION

BACKGROUND

1. Technical Field

Embodiments of the present disclosure relate to voice over Internet protocol (VoIP) communication technologies, and particularly to an apparatus and method for VoIP traffic flow identification.

2. Description of Related Art

Voice over Internet protocol technologies are widely used for provision of communication services over the public Internet, rather than via the public switched telephone network (PSTN). In order to improve quality of service (QOS) of the VoIP communication, a data exchange device (e.g., modem, router, or data exchange device) assigns a higher priority to VoIP traffic flow of the VoIP communication. Thus, the data exchange device needs to identify the VoIP traffic flow from a large amount of data flow. In a traditional solution, the data exchange device may identify the VoIP traffic flow by detecting whether each data package is a VoIP session control package. However, this kind of solution is prone to increase working load of the data exchange device. In another traditional solution, the data exchange device may identify the VoIP traffic flow according to a data size of the data flow, which is prone to mistaken identification. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
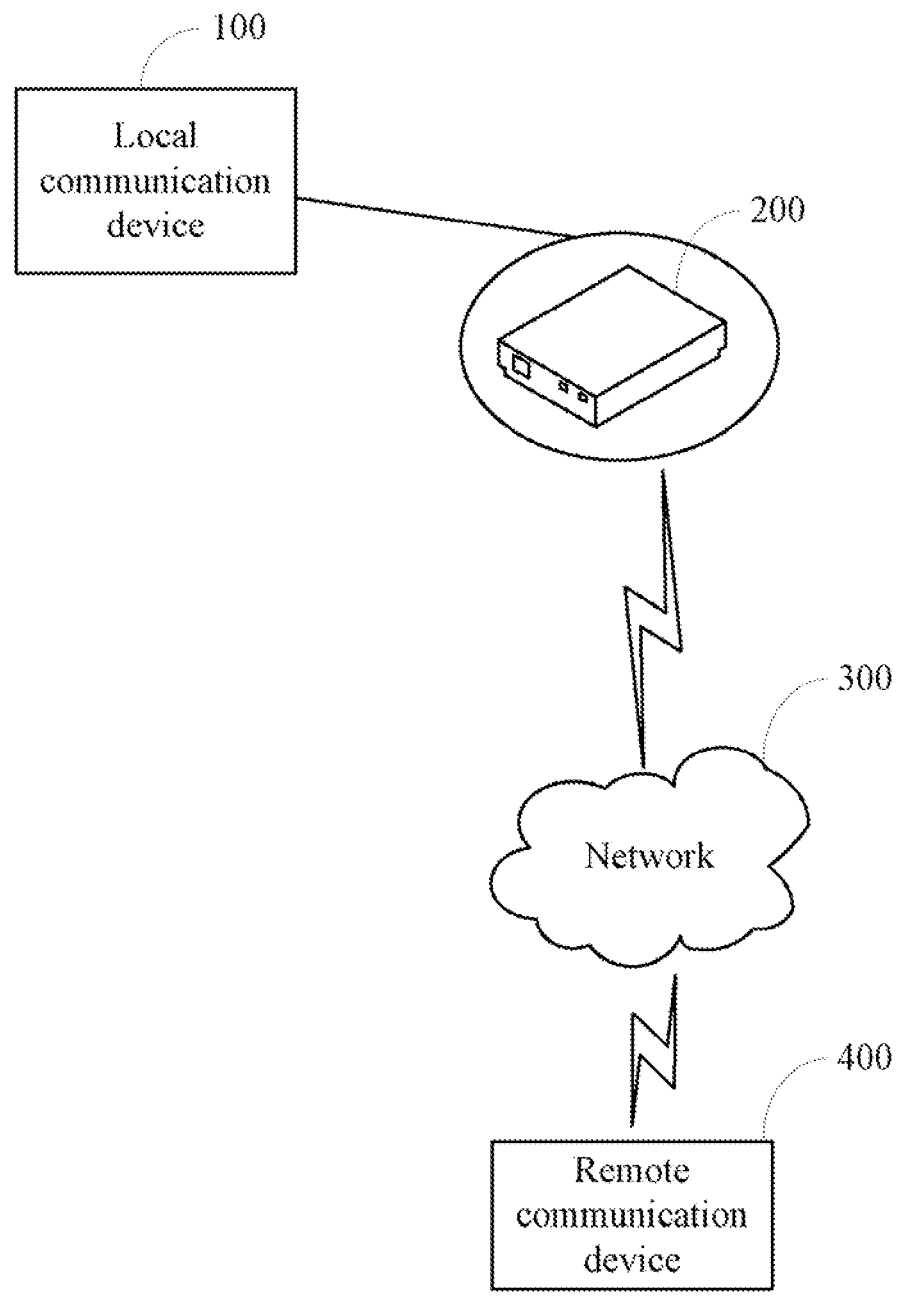
FIG. 1 is a schematic diagram illustrating one embodiment of a data exchange device used to establish a communication between a local communication device and a remote communication device through a network.

FIG. 1 is a schematic diagram illustrating one embodiment of a data exchange device 200 used to establish a communication between a local communication device 100 and a remote communication device 400 through a network 300. In the embodiment, the data exchange device 200 is connected to the local communication device 100 via a wired connection (e.g., cable or data line) or via a wireless connection (e.g., BLUETOOTH or WIFI). The data exchange device 200 connects the local communication device 100 to the network 300, and further establishes a voice communication between the local communication device 100 and the remote communication device 400 through the network 300.

In the embodiment, the data exchange device 200 may be, for example, a modem, a router, a gateway, or other similar devices. Both the local communication device 100 and the remote communication device 400 may be, for example, smart phones, personal digital assistants, fixed telephones, or other similar communication devices having voice over Internet protocol (VoIP) communication function. The network 300 may be, for example, world interoperability for microwave access (WIMAX) network, a second generation (2G) network, a third generation (3G) network, or other similar wireless communication networks. It should be understood that another data exchange device (not shown) can be used to connect between the remote communication device 400 and the network 300.

Figure 2:
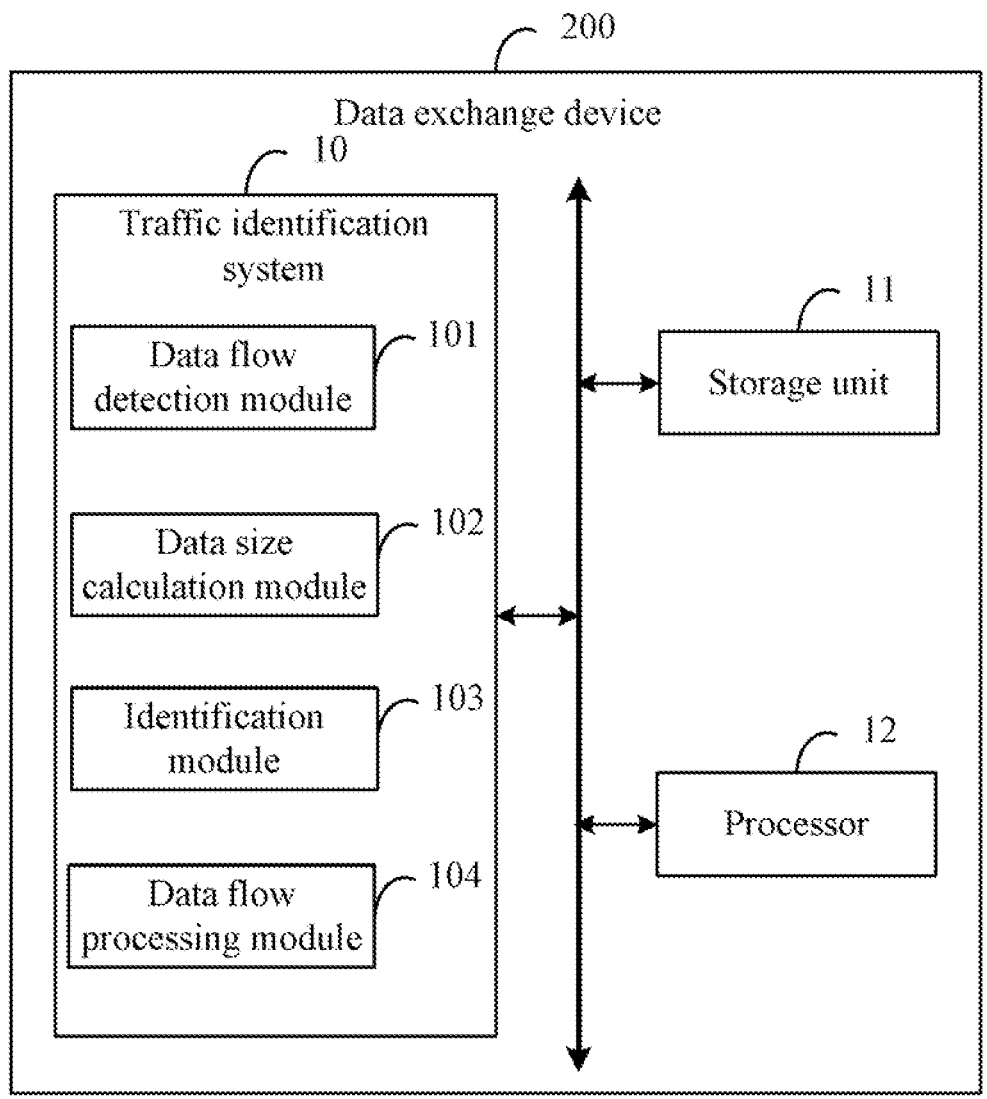
FIG. 2 is a schematic block diagram of the data exchange device of FIG. 1 including a plurality of functional modules.

FIG. 2 is a schematic block diagram of the data exchange device 200 of FIG. 1. The data exchange device 200 includes a storage unit 11, a processor 12, and a traffic flow identification system 10 having a plurality of functional modules. Each of the functional modules may include a plurality of programs in the form of one or more computerized instructions stored in the storage unit 11 and executed by the processor 12 to perform operations of the data exchange device 200. In the embodiment, the traffic flow identification system 10 includes a data flow detection module 101, a data size calculation module 102, an identification module 103, and an data flow processing module 104.

In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The data flow detection module 101 detects whether a type of data flow received by the data exchange device 200 is bidirectional traffic flow. In the embodiment, the bidirectional traffic flow represents that the type of data flow include both upstreaming data and downstreaming data. The upstreaming data refers to the data sent from the data exchange device 200 to the network 300, for example, voice data comes from the local communication device 100 to be sent to the remote communication device 400 by the data exchange device 200 via the network 300. The downstreaming data refers to the data flow into the data exchange device 200 via the network 300. In addition, the data flow detection module 101 further records traffic information of the type of data flow to differentiate the type of data flow from other flow generated by other applications. The traffic information of the type of data packages include source and/or destination of the type of data flow, an IP address of the source and/or destination, and a data size of the type of data flow, for example.

The data size calculation module 102 calculates a first data size (e.g., Traffic(T)$_{in}$) of the type of data flow which is input into the data exchange device 200 (downstreaming data) and a second data size (e.g., Traffic(T)$_{out}$) of the type of data flow which is output from the data exchange device 200 (upstreaming data) during a predetermined time period T (e.g., two or five seconds), if the type of data flow is bidirectional traffic flow.

The identification module 103 identifies whether the type of data flow is VoIP traffic flow according to the first data size and the second data size. In the embodiment, if the first data size and the second data size both are greater than a predetermined value and a ratio of the first data size to the second data size is within a predetermined value range (e.g., [0.9, 1.1]), the type of data flow is determined to be the VoIP traffic flow. The predetermined value is equal to or greater than 50 bytes.

The data flow processing module 104 assigns a high priority to the type of data flow for processing the type of data flow when the type of data flow is the VoIP traffic flow. The high priority assigned to the type of data flow may be preset by a user. In the embodiment, the data flow processing module 104 may assign a highest priority to the type of data flow if the type of data flow is the VoIP traffic flow. Further, if the type data flow is not the VoIP data flow, the data flow processing module 104 processes the type of data flow according to a normal priority.

Figure 3:
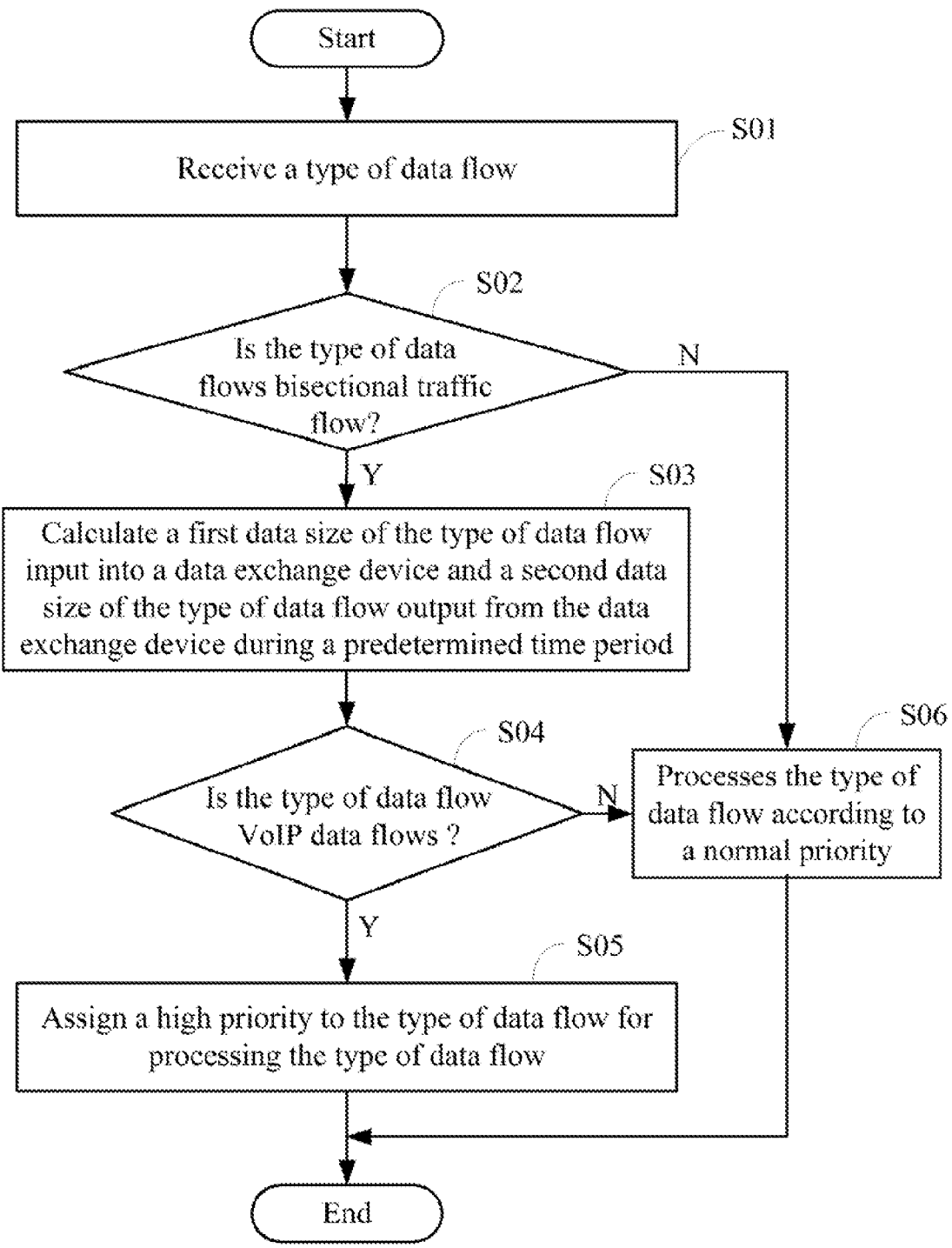
FIG. 3 is a flowchart of one embodiment of a method for VoIP traffic flow identification implemented by the data exchange device of FIG. 1.

FIG. 3 shows a flowchart of one embodiment of method for VoIP traffic flow identification implemented by the data exchange device 200 of FIG. 1. Depending on the embodiment, additional steps may be added, others removed, and the ordering of the steps may be changed.

In step S01, the data exchange device 200 receives a type of data flow.

In step S02, the data flow detection module 101 detects whether the type of data flow received by the data exchange device 200 is bidirectional traffic flow. If the type of data flow is the bidirectional traffic flow, step S03 is implemented. Otherwise, if the type of data flow is not the bidirectional traffic flow, step S06 is implemented.

In step S03, the data size calculation module 102 calculates a first data size of the type of data flow input into the data exchange device 200 and a second data size of the type of data flow output from the data exchange device 200 during a predetermined time period.

In step S04, the identification module 103 identifies whether the type of data flow is VoIP traffic flow according to the first data size and the second data size. In the embodiment, if the first data size and the second data size both are greater than a predetermined value and a ratio of the first data size to the second data size is within a predetermined value range, the type of data flow is determined to be the VoIP traffic flow, and the procedure goes to step S05. Otherwise, if the type of data flow is not the VoIP traffic flow, the procedure goes to step S06.

In step S05, the data flow processing module 104 assigns a high priority to the type of data flow for processing the type of data flow, the procedure ends.

In step S06, the type of data flow is processed according to a normal priority.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for voice over Internet protocol (VoIP) traffic flow implemented by a data exchange device, the data exchange device configured to establish a VoIP communication between a local communication device and a remote communication device a network, the method comprising:
    detecting whether a type of data flow received by the data exchange device is bidirectional traffic flow;
    calculating a first data size of the type of data flow input into the data exchange device and a second data size of the type of data flow output from the data exchange device during a predetermined time period when the type of data flow is the bidirectional traffic flow;
    identifying whether the type of data flow is the VoIP traffic flow according to the first data size and the second data size; and
    assigning a high priority to the type of data flow for processing the type of data flow when the type of data flow is the VoIP traffic flow.

2. The method according to claim 1, further comprising:
    recording traffic information of the type of data flow to differentiate the type of data flow from other flows generated by other applications.

3. The method according to claim 2, wherein the traffic information of the type of data packages comprise source and/or destination of the type of data flow, an IP address of the source and/or destination, and a data size of the type of data flow.

4. The method according to claim 1, wherein when the first data size and the second data size both are greater than a predetermined value and a ratio of the first data size to the second data size is within a predetermined value range, the type of data flow is determined to be the VoIP traffic flow.

5. The method according to claim 4, wherein the predetermined value is equal to or greater than 50 bytes, and the predetermined value range is between 0.9 and 1.1.

6. The method according to claim 1, wherein the type of data flow is processed according to a normal priority when the type of data flow is not the bidirectional traffic flow or the VoIP traffic flow.

7. The method according to claim 1, wherein the data exchange device is a gateway, a router, or a modem.

8. A data exchange device configured to establish a voice over Internet protocol (VoIP) communication between a local communication device and a remote communication device via a network, comprising:
    a processor;
    a storage unit;
    one or more programs stored in the storage unit and executed by the processor to perform a method of:
    detecting whether a type of data flow received by the data exchange device is bidirectional traffic flow;
    calculating a first data size of the type of data flow input into the data exchange device and a second data size of the type of data flow output from the data exchange device during a predetermined time period when the type of data flow is the bidirectional traffic flow;
    identifying whether the type of data flow is the VoIP traffic flow according to the first data size and the second data size; and
    assigning a high priority to the type of data flow for processing the type of data flow when the type of data flow is the VoIP traffic flow.

9. The data exchange device according to claim 8, wherein the method further comprises:
    recording traffic information of the type of data flow to differentiate the type of data flow from other flow generated by other applications.

10. The data exchange device according to claim 9, wherein the traffic information of the type of data packages comprise source and/or destination of the type of data flow, an IP address of the source and/or destination, and a data size of the type of data flow.

11. The data exchange device according to claim 8, wherein when the first data size and the second data size both are greater than a predetermined value and a ratio of the first data size to the second data size is within a predetermined value range, the type of data flow is determined to be the VoIP traffic flow.

12. The data exchange device according to claim 11, wherein the predetermined value is equal to or greater than 50 bytes, and the predetermined value range is between 0.9 and 1.1.

13. The data exchange device according to claim 8, wherein the type of data flow is processed according to a normal priority when the type of data flow is not the bidirectional traffic flow or the VoIP traffic flow.

14. The data exchange device according to claim 8, wherein the data exchange device is a gateway, a router, or a modem.

\* \* \* \* \*